United States Patent
Das et al.

(10) Patent No.: US 10,574,755 B2
(45) Date of Patent: Feb. 25, 2020

(54) METHOD AND HIGH PERFORMANCE COMPUTING (HPC) SWITCH FOR OPTIMIZING DISTRIBUTION OF DATA PACKETS

(71) Applicant: WIPRO LIMITED, Bangalore (IN)

(72) Inventors: Rishav Das, Howrah (IN); Sourav Mudi, Burdwan (IN)

(73) Assignee: Wipro Limited, Bangalore (IN)

( * ) Notice: Subject to any disclaimer, the term of this patent is extended or adjusted under 35 U.S.C. 154(b) by 15 days.

(21) Appl. No.: 15/938,844

(22) Filed: Mar. 28, 2018

(65) Prior Publication Data

US 2019/0306239 A1    Oct. 3, 2019

(30) Foreign Application Priority Data

Mar. 28, 2018  (IN) .............................. 201841011556

(51) Int. Cl.
| | | |
|---|---|---|
| H04L 29/08 | (2006.01) | |
| H04L 12/933 | (2013.01) | |
| H04L 12/935 | (2013.01) | |
| H04L 12/931 | (2013.01) | |

(52) U.S. Cl.
CPC .......... *H04L 67/1097* (2013.01); *H04L 49/15* (2013.01); *H04L 49/3036* (2013.01); *H04L 49/356* (2013.01); *H04L 49/358* (2013.01); *H04L 49/70* (2013.01)

(58) Field of Classification Search
CPC ....... H04L 49/358; H04L 49/70; H04L 49/25; H04L 47/2408; H04L 45/00; H04L 45/302; H04L 47/125
See application file for complete search history.

(56) References Cited

U.S. PATENT DOCUMENTS

| | | | |
|---|---|---|---|
| 7,327,749 B1 | 2/2008 | Mott | |
| 7,830,793 B2 | 11/2010 | Gai et al. | |
| 8,370,496 B1 | 2/2013 | Marr | |
| 2005/0271074 A1* | 12/2005 | Johnsen | ............... H04L 49/205 370/428 |
| 2009/0073999 A1 | 3/2009 | Craddock et al. | |

(Continued)

*Primary Examiner* — Khaled M Kassim
*Assistant Examiner* — Najeeb Ansari
(74) *Attorney, Agent, or Firm* — Finnegan, Henderson, Farabow, Garrett & Dunner, LLP

(57) ABSTRACT

The present subject matter relates generally to optimization of distribution of data packets in a High Performance Computing (HPC) switch. The HPC switch receives data packets from controllers communicatively connected to HPC switch, through interconnected Queue Pair (QP) lanes and assigns a destination virtual lane (VL) for each data packet based on service level information. Further, the HPC switch generates plurality of clusters of ports that are coupled with each interconnected VL based on latency determined dynamically for each port. Finally, the HPC switch transmits a first group of data packets through ports belonging to a primary cluster of plurality of clusters and transmits acknowledgement key-packet associated with second group of data packets through the ports belonging to secondary clusters of plurality of clusters, based on destination VL assigned for each data packet to other controllers for optimizing the distribution of the plurality of data packets in the HPC switch.

17 Claims, 6 Drawing Sheets

(56) References Cited

U.S. PATENT DOCUMENTS

| | | | |
|---|---|---|---|
| 2016/0127236 A1* | 5/2016 | Zahid | H04L 45/04 |
| | | | 709/219 |
| 2017/0104682 A1* | 4/2017 | Zahid | H04L 47/125 |
| 2017/0149887 A1* | 5/2017 | Tasoulas | H04L 67/1095 |
| 2017/0324646 A1* | 11/2017 | Johnsen | H04L 47/20 |
| 2017/0324703 A1* | 11/2017 | Johnsen | H04L 61/25 |
| 2018/0011763 A1* | 1/2018 | Tanaka | G06F 13/10 |
| 2018/0316602 A1* | 11/2018 | Chen | H04L 45/22 |
| 2019/0173944 A1* | 6/2019 | Tasoulas | H04L 67/1095 |

* cited by examiner

METHOD AND HIGH PERFORMANCE COMPUTING (HPC) SWITCH FOR OPTIMIZING DISTRIBUTION OF DATA PACKETS

TECHNICAL FIELD

The present subject matter relates generally to networking environment, and more particularly, but not exclusively to a method and a High Performance Computing (HPC) switch for optimizing distribution of data packets.

BACKGROUND

Generally, a server provides communication services to applications that are supported by the server. As an example, the server may provide one service for storage, another service for networking and a third service for inter-process communication. An Operating System (OS) present in the server, owns resources that are required by the applications and may provide the resources to the applications on requirement basis. Since, the OS manages multiple processes of many different applications within one controller, communicating with other processes of applications active in other controllers, may result in poor performance. Therefore, High Performance Computing (HPC) switches are introduced to improve performance in high performance computing and networking infrastructure. The HPC switches are mainly used in high end enterprise storage systems.

Though, the HPC Switches are introduced in high end enterprise storage systems to provide high speed message transmission, there may occur multiple limitations that generally arise when syncing together multiple enterprise storage systems, especially when Central Processing Unit (CPU) utilization is 100% for Storage Area Network (SAN). Currently, "Infiniband (IB)" is a widely used HPC switch, that provides a high bandwidth and low latency while performing interprocess communications. However, at any given point of time, the IB can establish connection between only two controllers belonging to same cluster and same Redundant Array of Independent Disks (RAID), which means that target controllers are always fixed for any given IB connection in high end storage systems.

When the target controllers are fixed, message transmission may be highly affected in scenarios such as, when target controllers are busy or when the connection between the target controllers is not strong enough or when one of the target controller is down. In most of the cases, the target controllers may be busy in Input/output Operations Per Second (TOPS) transactions that shows a negative impact on communication by other controller. In some scenarios, Inter Process Communication (IPC) message delivery may fail when the target controller is busy with other transactions, since the target controller may not be able to receive messages within expected time. Similarly, initiation of the IPC message delivery may be delayed, when the controller which is supposed to initiate the IPC message delivery is busy with other transactions. In such scenarios, a process that wants to initiate the IPC message delivery may have to wait until the controller is free to carry out the IPC message delivery, thereby, causing delay in communication. In some scenarios, such delay in communication may kill other child processes associated with the process. Further, in scenarios where adequate network strength is not present, the message packets may arrive late which causes a delay in the IPC message delivery. In some scenarios, lack of remote access to memory, may result in timeout, which may demand restarting or rebooting the target controller. Typically, reboot of the target controller may affect the IPC message delivery and also the IOPS transactions.

Therefore, currently existing IB switch experiences a major drop in performance in scenarios where connection between the controllers is not strong, when target controllers are busy, when initiator controllers are busy, when there is a memory shrinkage, when there is any issue with host channel adapter connected to the IB switch and the like.

The information disclosed in this background of the disclosure section is only for enhancement of understanding of the general background of the disclosure and should not be taken as an acknowledgement or any form of suggestion that this information forms prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of optimizing distribution of data packets in a High Performance Computing (HPC) switch. The method includes receiving, by the HPC switch, a plurality of data packets from one or more controllers communicatively connected to the HPC switch, through a plurality of interconnected Queue Pair (QP) lanes configured in the HPC switch. Further, the HPC switch assigns a destination virtual lane (VL) from a plurality of interconnected VLs configured in the HPC switch for each of the plurality of data packets based on service level information associated with each of the plurality of data packets. Upon assigning the destination VL, the HPC switch generates a plurality of clusters of one or more ports, configured in the HPC switch, coupled with each of the plurality of interconnected VLs based on latency determined dynamically for each of the one or more ports. Further, the HPC switch determines a first group of the plurality of data packets to be transmitted through the one or more ports belonging to a primary cluster of the plurality of clusters and a second group of the plurality of data packets to be transmitted through the one or more ports belonging to one or more secondary clusters of the plurality of clusters based on the destination VL assigned for each of the plurality of data packets. Finally, the HPC switch transmits the first group of the plurality of data packets through the one or more ports belonging to the primary cluster and transmits an acknowledgement key-packet associated with the second group of the plurality of data packets through the one or more ports belonging to the one or more secondary clusters, based on the determination, to the one or more other controllers communicatively connected to the HPC switch, for optimizing the distribution of the plurality of data packets in the HPC switch.

Further, the present disclosure includes a High Performance Computing (HPC) switch for optimizing distribution of data packets. The HPC switch includes a processor and a memory communicatively coupled to the processor. The memory stores the processor-executable instructions, which, on execution, causes the processor to receive a plurality of data packets from one or more controllers communicatively connected to the HPC switch, through a plurality of interconnected Queue Pair (QP) lanes configured in the HPC switch. Further, the processor assigns a destination virtual lane (VL) from a plurality of interconnected VLs configured in the HPC switch for each of the plurality of data packets based on service level information associated with each of the plurality of data packets. Upon assigning the destination VL, the processor generates a plurality of clusters of one or more ports, configured in the HPC switch, coupled with each of the plurality of interconnected VLs based on latency determined dynamically for each of the one or more ports. Further, the processor determines a first group of the plurality of data packets to be transmitted through the one or more ports belonging to a primary cluster of the plurality of clusters and a second group of the plurality of data packets to be transmitted through the one or more ports belonging to one or more secondary clusters of the plurality of clusters based on the destination VL assigned for each of the plurality of data packets. Finally, the processor transmits the first group of the plurality of data packets through the one or more ports belonging to the primary cluster and transmits an acknowledgement key-packet associated with the second group of the plurality of data packets through the one or more ports belonging to the one or more secondary clusters, based on the determination, to the one or more other controllers communicatively connected to the HPC switch, for optimizing the distribution of the plurality of data packets in the HPC switch.

Furthermore, the present disclosure includes a non-transitory computer readable medium including instructions stored thereon that when processed by at least one processor causes a High Performance Computing (HPC) switch to perform operations including receive a plurality of data packets from one or more controllers communicatively connected to the HPC switch, through a plurality of interconnected Queue Pair (QP) lanes configured in the HPC switch. Further, the instructions cause the processor to assign a destination virtual lane (VL) from a plurality of interconnected VLs configured in the HPC switch for each of the plurality of data packets based on service level information associated with each of the plurality of data packets. Upon assigning the destination VL, the HPC switch generates a plurality of clusters of one or more ports, configured in the HPC switch, coupled with each of the plurality of interconnected VLs based on latency determined dynamically for each of the one or more ports. Further, the instructions cause the processor to determine a first group of the plurality of data packets to be transmitted through the one or more ports belonging to a primary cluster of the plurality of clusters and a second group of the plurality of data packets to be transmitted through the one or more ports belonging to one or more secondary clusters of the plurality of clusters based on the destination VL assigned for each of the plurality of data packets. Finally, the instructions cause the processor to transmit the first group of the plurality of data packets through the one or more ports belonging to the primary cluster and transmits an acknowledgement key-packet associated with the second group of the plurality of data packets through the one or more ports belonging to the one or more secondary clusters, based on the determination, to the one or more other controllers communicatively connected to the HPC switch, for optimizing the distribution of the plurality of data packets in the HPC switch.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
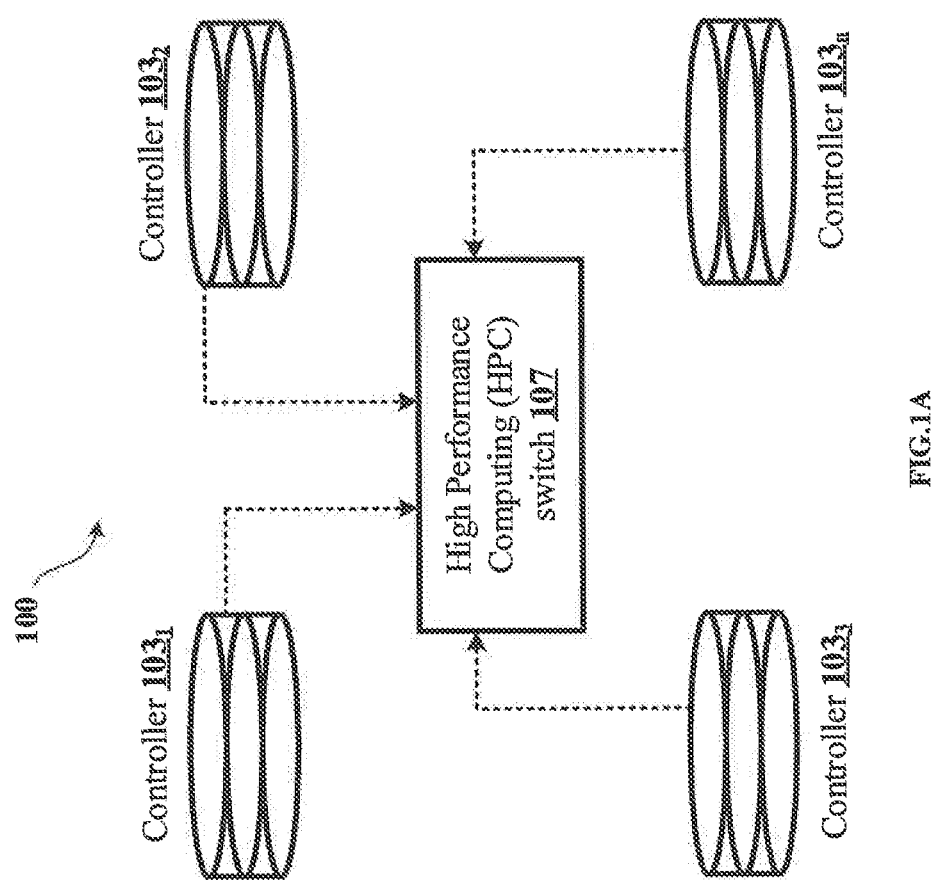
FIG. 1A shows an exemplary network architecture illustrating method of optimizing distribution of data packets in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a High Performance Computing (HPC) switch and a method for optimizing distribution of data packets in the HPC switch. In the present disclosure, internal architecture of the HPC switch is reconstructed to achieve optimal distribution of the data packets. The HPC switch is configured with a plurality of interconnected Queue Pair (QP) lanes and a plurality of interconnected Virtual Lanes (VL), as opposed to traditional architecture of the HPC switch that includes individual QPs and VLs that are not interconnected. Initially, the HPC switch may receive a plurality of data packets from one or more controllers communicatively connected to the HPC switch, through the plurality of interconnected QP lanes. Further, the HPC switch may assign a destination virtual lane (VL) from a plurality of interconnected VLs configured in the HPC switch for each of the plurality of data packets based on service level information associated with each of the plurality of data packets. In some embodiments, the service level information of the plurality of data packets may be related to priority associated with each of the plurality of data packets. As an example, consider that the plurality of data packets being transmitted from one controller to another controller are related to a banking project, where a few of the plurality of data packets include data related to Automated Teller Machine (ATM) and few other plurality of data packets include corporate data related to bank. In such scenarios, the plurality of data packets including the data related to the ATM may be given a higher priority than the plurality of data packets include the corporate data related to the bank. In some embodiments, the plurality of data packets may be reassigned to a different destination VL, when required. Further, the HPC switch may generate an acknowledgement key-packet for each of the plurality of data packets. In some embodiments, the acknowledgement key-packet may include, but not limited to, a key value indicating destination of each of the plurality of data packets. In some embodiments, size of the acknowledgement key-packet may be less than size of the corresponding plurality of data packets.

Upon assigning the destination VL, the HPC switch may compute a performance value for each of one or more ports configured in the HPC switch, coupled with each of the plurality of interconnected VLs. The HPC switch may compute performance value based on number of data packets received and transmitted by each of the plurality of interconnected QP lanes for each of the one or more ports. Further, the HPC switch may determine latency of each of the one or more ports based on the performance value computed for each of the one or more ports. Upon determining the latency of each of the one or more ports, the HPC switch may generate a plurality of clusters of the one or more ports, based on the latency determined dynamically for each of the one or more ports.

Further, the HPC switch may classify the plurality of clusters into two major categories, a primary cluster and one or more secondary clusters. In some embodiments, the primary cluster among the plurality of clusters includes the one or more ports having ultra-low latency when compared with a predefined latency threshold. In some embodiments, each of the one or more secondary clusters of the plurality of clusters include the one or more ports having high latency when compared with the predefined latency threshold. In other words, the one or more ports having the latency less than the predefined latency threshold may be considered as the one or more ports with ultra-low latency. The one or more ports having the latency more than the predefined latency threshold may be considered as the one or more ports with high latency.

Upon classifying the plurality of clusters, the HPC switch may determine a first group of the plurality of data packets to be transmitted through the one or more ports belonging to the primary cluster and a second group of the plurality of data packets to be transmitted through the one or more ports belonging to the one or more secondary clusters, based on the destination VL assigned for each of the plurality of data packets. Finally, the HPC switch may transmit the first group of the plurality of data packets to the one or more other controllers associated with the HPC switch, through the one or more ports belonging to the primary cluster. However, for the second group of the plurality of data packets, the HPC switch may transmit only the acknowledgement key-packet of the corresponding plurality of data packets to the one or more other controllers. Since, the size of the acknowledgement key-packet is less than the size of the corresponding data packet, the acknowledgement key-packet may be easily transmitted to the one or more other controllers, in spite of the high latency. In some embodiments, the acknowledgement key-packet provides an assurance to the one or more other controllers that the corresponding plurality of data packets would be transmitted in a while.

Further, the HPC switch may store the second group of the plurality of data packets for which the acknowledgement key-packet is transmitted, in a Direct Memory Access (DMA) configured in the HPC switch. At predefined time intervals, the HPC switch may recompute a performance value associated with each of the one or more ports to generate a plurality of new clusters of the one or more ports. Upon generating the plurality of new clusters, the HPC switch may re-distribute the plurality of data packets stored in the DMA and a plurality of new data packets received by the HPC switch into the first group and the second group, for transmission, as explained above.

Therefore, using the HPC switch with the new architecture, the plurality of data packets are classified into the first group and the second group such that, only the plurality of data packets belonging to the first group may be transmitted via the one or more ports belonging to the primary cluster. Since, the one or more ports belonging to the primary cluster have ultra-low latency, the plurality of data packets belonging to the first group may be transmitted at high speed without any delay. Further, since, the one or more ports belonging to the one or more secondary clusters have high latency, the plurality of data packets belonging to the second group may be stored in the DMA until the one or more ports are re-clustered based on the latency. However, the acknowledgement key-packet is transmitted on behalf of the plurality of data packets belonging to the second group, such that the one or more controllers would be aware of status of the plurality of data packets and may perform necessary mapping steps for receiving the plurality of data packets, thereby reducing overall time involved in receiving and storing the plurality of data packets. In this manner, the present disclosure performs optimal distribution of the plurality of data packets for improving performance of the HPC switch.

A description of an embodiment with several components in communication with each other does not imply that all such components are required. On the contrary a variety of optional components are described to illustrate the wide variety of possible embodiments of the invention.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an exemplary network architecture illustrating method of optimizing distribution of data packets in accordance with some embodiments of the present disclosure.

The architecture 100 includes one or more controllers, controller $103_1$ to controller $103_n$ (collectively referred as one or more controllers 103) and a High Performance Computing (HPC) switch 107. In some embodiments, each of the one or more controllers 103 may be communicatively connected to the HPC switch 107 as shown in the FIG. 1A. Each of the one or more controllers 103 may transmit plurality of data packets to each of the one or more other controllers 103 and receive the plurality of data packets from each of the one or more other controllers 103 via the HPC switch 107 using a communication network (not shown in the FIG. 1A). As an example, the plurality of data packets may be exchanged between the one or more controllers 103 in scenarios such as sharing messages of Central Processing Unit (CPU), sequential metadata collection, metadata dumping such as journal metadata dumping, hardware monitoring, cluster management and the like. In some embodiments, the communication network may be a wired communication network and a wireless communication network. In the context of the present disclosure, phrase "one or more controllers" may be used to refer to the controllers that initiate a transmission and phrase "one or more other controllers" may be used to refer to other controllers connected to the HPC switch 107, destined for receiving the plurality of data packets from the one or more controllers 103.

Figure 1B:
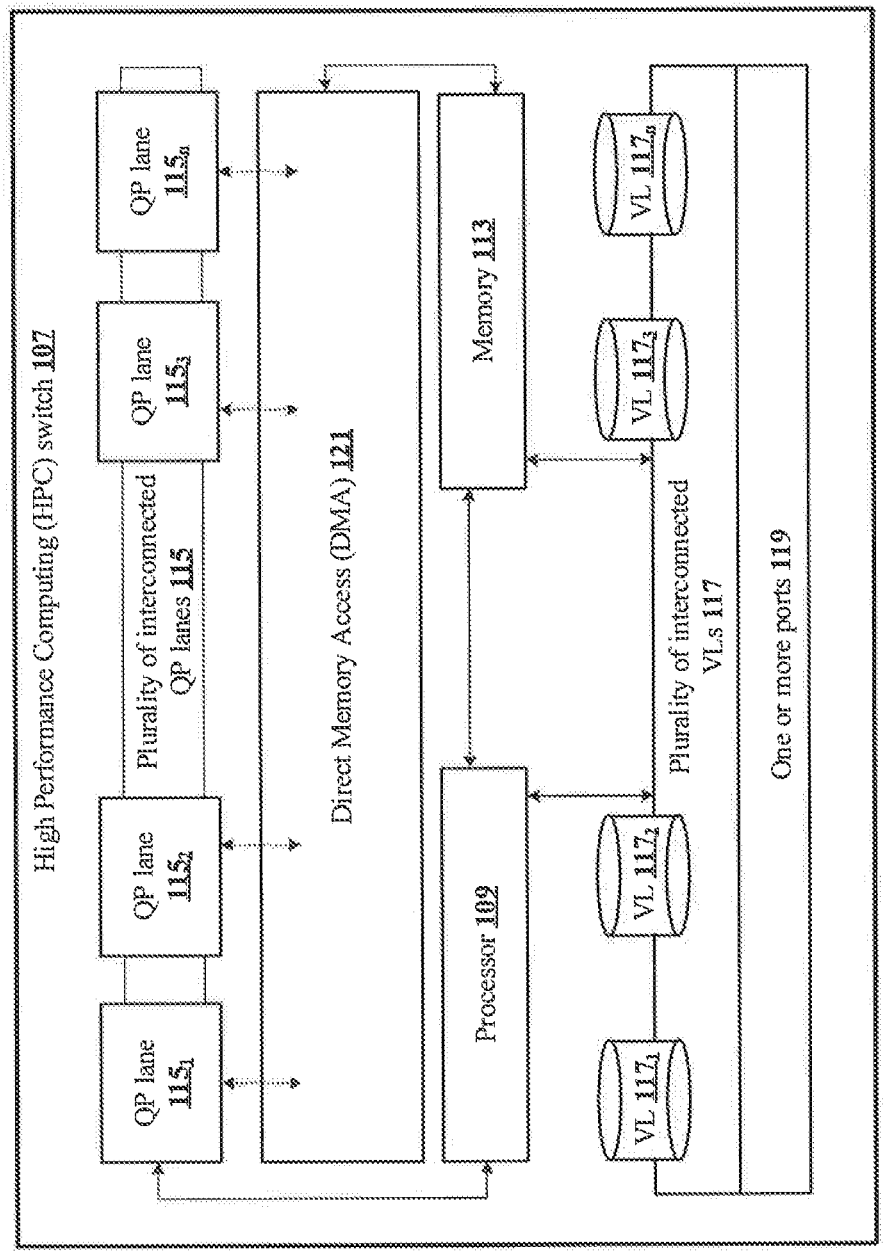
FIG. 1B shows an exemplary architecture of a High Performance Computing (HPC) switch in accordance with some embodiments of the present disclosure.

In a preferred embodiment, the HPC switch 107 may include, but not limited to, a processor 109, a memory 113, a plurality of interconnected Queue Pair (QP) lanes, QP lane $115_1$ to QP lane $115_n$ (collectively referred as plurality of interconnected QP lanes 115), a plurality of interconnected Virtual Lanes (VL), VL $117_1$ to VL $117_n$ (collectively referred as plurality of interconnected VLs 117), one or more ports 119 and a Direct Memory Access (DMA) 121, as shown in the FIG. 1B. In some embodiments, each of the plurality of interconnected QP lanes 115 may include a send queue and a receive queue. In some embodiments, the receive queue may include the plurality of data packets that may be received from the one or more controllers 103. In some embodiments, the send queue may include the plurality of data packets that are required to be transmitted to one or more other controllers 103. The send queue and the receive queue may be linked to form the QP lanes 115. In some embodiments, each QP lane 115 may be connected between two of the one or more controllers 103. Further, each such QP lane 115 connected between each of the one or more controllers 103 may be interconnected/pooled together to form the plurality of interconnected QP lanes 115. Similarly, each VL 117 configured in the HPC switch 107 may be interconnected/pooled together to form the plurality of interconnected VLs 117. In some embodiments, the plurality of interconnected VLs 117 act as a buffering arena from where the plurality of data packets get transmitted or where the plurality of data packets arrives. Each of the plurality of interconnected VLs 117 may be associated with the one or more ports 119 configured in the HPC switch 107. In some embodiments, the one or more ports 119 may help in receiving and transmitting data packets between the one or more controllers 103. In some embodiments, each of the plurality of data packets may include a service level bit that provides service level information required by each of the plurality of data packets. The service level information may help in identifying a destination VL that matches service level required for each of the plurality of data packets.

Further, the DMA 121 may store the plurality of data packets that needs to be transmitted from one controller to another. In some embodiments, the DMA 121 may store and transmit the plurality of data packets concurrently. However, the memory 113 may store instructions for the processor 109, to optimize distribution of the plurality of data packets. In some embodiments, the memory 113 may also store data generated by the processor 109 upon executing instructions stored in the memory 113 to optimize the distribution of the plurality of data packets.

Figure 2A:
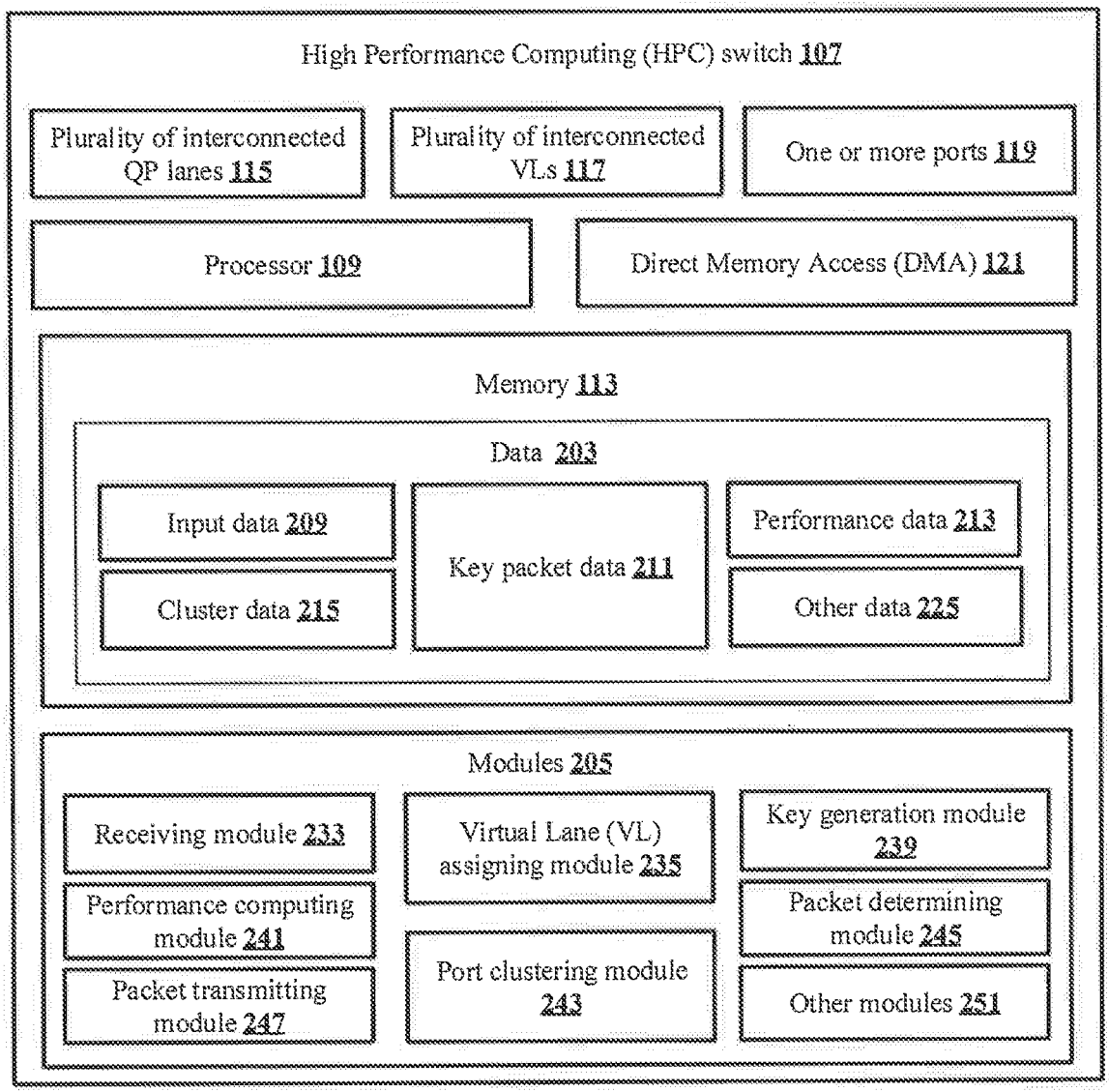
FIG. 2A shows a detailed block diagram of a High Performance Computing (HPC) switch for optimizing distribution of data packets in accordance with some embodiments of the present disclosure.

FIG. 2A shows a detailed block diagram of the HPC switch 107 for optimizing distribution of data packets in accordance with some embodiments of the present disclosure.

In some implementations, the HPC switch 107 may include data 203 and modules 205. As an example, the data 203 is stored in the memory 113 configured in the HPC switch 107 as shown in the FIG. 2A. In one embodiment, the data 203 may include input data 209, key packet data 211, performance data 213, cluster data 215 and other data 225. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 225 may store data, including temporary data and temporary files, generated by the modules 205 for performing the various functions of the HPC switch 107.

In some embodiments, the data 203 stored in the memory 113 may be processed by the modules 205 of the HPC switch 107. The modules 205 may be stored within the memory 113. In an example, the modules 205 communicatively coupled to the processor 109 configured in the HPC switch 107, may also be present outside the memory 113 as shown in FIG. 2A and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 233, a Virtual Lane (VL) assigning module 235, a key generation module 239, a performance computing module 241, a port clustering module 243, packet determining module 245, packet transmitting module 247 and other modules 251. The other modules 251 may be used to perform various miscellaneous functionalities of the HPC switch 107. It will be appreciated that such aforementioned modules 205 may be represented as a single module or a combination of different modules.

In some embodiments, the receiving module 233 may receive a plurality of data packets from one or more controllers 103 communicatively connected to the HPC switch 107, through a plurality of interconnected Queue Pair (QP) lanes 115 configured in the HPC switch 107. The plurality of data packets received from the one or more controllers 103 may be stored as the input data 209.

In some embodiments, the VL assigning module 235 may assign a destination VL from a plurality of interconnected VLs 117 configured in the HPC switch 107 for each of the plurality of data packets. In some embodiments, the VL assigning module 235 may initially identify service level information of each of the plurality of data packets based on a service level bit associated with each of the plurality of data packets. In some embodiments, the service level information specifies kind of services that a particular data packet would like to avail from the HPC switch 107. Based on the service level information, the VL assigning module 235 may assign the destination VL for each of the plurality of data packets, from the plurality of interconnected VLs 117.

In some embodiments, the key generation module 239 may generate an acknowledgement key-packet for each of the plurality of data packets. In some embodiments, the acknowledgement key-packet may include, but not limited to, a key value indicating destination of each of the plurality of data packets. In some embodiments, the acknowledgement key-packet generated by the key generation module 239 for each of the plurality of data packets is stored as the key packet data 211. An exemplary key packet data 211 may include the following details:

Key Value: NT #345
Data packet Identifier: X1-SC2-IB-2#23OB
Size of the key packet: 16 kb Further, size of the acknowledgement key-packet may be less than size of the corresponding plurality of data packets.

In some embodiments, the performance computing module 241 may compute a performance value for each of the one or more ports 119 configured in the HPC switch 107, coupled with each of the plurality of interconnected VLs 117. In some embodiments, the performance computing module 241 may compute the performance value for each of the one or more ports 119 based on number of data packets received and transmitted by each of the plurality of interconnected QP lanes 115 for each of the one or more ports 119. The performance computing module 241 may continuously monitor transmission rate and receiving rate of the plurality of data packets at each of the plurality of interconnected QP lanes 115 to determine the number of data packets received and transmitted by each of the plurality of interconnected QP lanes 115 for each of the one or more ports 119.

In some embodiments, the performance computing module 241 may compute the performance value for each of the one or more ports 119 using the below Equations 1 and 2.

$$\text{Performance value}_{(transmitted)} = ((N_{SQ})/T_{QP}) * 100 \quad \text{Equation 1}$$

$$\text{Performance value}_{(received)} = ((N_{RQ})/T_{QP}) * 100 \quad \text{Equation 2}$$

In the above Equations 1 and 2, $N_{SQ}$ indicates number of data packets transmitted by a send queue of the QP lane 115;

$N_{RQ}$ indicates number of data packets received by a receive queue of the QP lane 115; and $T_{QP}$ indicates total number of data packets transmitted and received by the QP lane 115.

Upon computing the performance value, the performance computing module 241 may further determine latency of each of the one or more ports 119 based on the corresponding performance value, in real-time. In some embodiments, the performance computing module 241 may use one or more predefined techniques to determine the latency of each of the one or more ports 119. In some embodiments, the performance value and the latency determined by the performance computing module 241 for each of the one or more ports 119 may be stored as the performance data 213.

In some embodiments, the port clustering module 243 may generate a plurality of clusters of the one or more ports 119, based on the latency determined for each of the one or more ports 119. The plurality of clusters of the one or more ports 119 may be stored as the cluster data 215. In some embodiments, number of clusters to be formed may be preconfigured in the HPC switch 107. In some embodiments, the port clustering module 243 may measure distance between the performance value of each of the one or more ports 119 and centre of the plurality of clusters, to identify the one or more ports 119 belonging to each of the plurality of clusters. As an example, the port clustering module 243 may use techniques such as Mahalanobis distance, Euclidean distance and the like.

In some embodiments, one cluster among the plurality of clusters may be considered as a primary cluster and rest of the plurality of clusters may be considered as the one or more secondary clusters. The primary cluster may include the one or more ports 119 having an ultra-low latency when compared to a predefined latency threshold. The one or more secondary clusters may include the one or more ports 119 having a high latency when compared to the predefined latency threshold.

As an example, consider the predefined latency threshold is 20 seconds, therefore the primary cluster may include the one or more ports 119 whose latency is less than the 20 seconds and rest of the one or more ports would belong to the one or more secondary clusters based on centre of the each cluster.

In some embodiments, the packet determining module 245 may determine the plurality of data packets that may be transmitted through each of the plurality of clusters. The packet determining module 245 may determine a first group of the plurality of data packets to be transmitted through the one or more ports 119 belonging to the primary cluster and a second group of the plurality of data packets to be transmitted through the one or more ports 119 belonging to the one or more secondary clusters, based on the destination VL assigned for each of the plurality of data packets. In other words, the plurality of data packets that are assigned with the destination VL connected with the one or more ports 119 belonging to the primary cluster, may form the first group of the plurality of data packets. Similarly, the plurality of data packets that are assigned with the destination VL connected with the one or more ports 119 belonging to the one or more secondary clusters, may form the second group of the plurality of data packets.

In some embodiments, the packet transmitting module 247 may transmit the first group of the plurality of data packets to the one or more other controllers 103 associated with the HPC switch 107, through the one or more ports 119 belonging to the primary cluster. However, for the second group of the plurality of data packets, the packet transmitting module 247 may transmit only the acknowledgement key-packet of the corresponding plurality of data packets to the one or more other controllers 103. Since, the size of the acknowledgement key-packet is less than the size of the corresponding data packet, the acknowledgement key-packet may be easily transmitted to the one or more other controllers 103, though the one or more ports 119 of the one or more secondary clusters have high latency. In some embodiments, the acknowledgement key-packet may provide an assurance to the one or more other controllers 103 regarding arrival of the second group of the plurality of data packets in some time. In some embodiments, the second group of the plurality of data packets whose corresponding acknowledgement key-packets are transmitted to the one or more other controllers 103 may be stored in the Direct Memory Access 121.

In some embodiments, the performance computing module 241 may recompute a performance value for each of the one or more ports 119 at predefined time intervals. As an example, the predefined time interval may be 1 second. The transmission rate and receiving rate at each of the plurality of interconnected QP lanes 115 may vary every second due to plurality of new data packets received and transmitted by the HPC switch 107. Therefore, there is a need for the performance computing module 241 to recompute the performance value for each of the one or more ports 119 at the predefined time intervals with an objective of generating one or more new clusters. Based on the recomputed performance value, the port clustering module 243 may generate the one or more new clusters of the one or more ports 119. In some embodiments, the one or more ports 119 that belong to the primary cluster in a previous iteration, may or may not belong to the primary cluster in current iteration. In other words, the one or more ports 119 may be shuffled into the one or more new clusters based on the recomputed performance value. Further, the packet transmitting module 247 may identify the first group from the plurality of data packets stored in the DMA 121 and a plurality of new data packets received by the HPC switch 107, that are assigned to the destination VLs connected to the one or more ports 119 of a new primary cluster in the current iteration. Further, the packet transmitting module 247 may transmit only the first group of the plurality of data packets stored in the DMA 121 and the plurality of new data packets, to the one or more other controllers 103, while transmitting an acknowledgement key-packet for each of the second group of the plurality of data packets stored in the DMA 121 and the plurality of new data packets.

The above mentioned process may be continued iteratively in the HPC switch 107 every second, to optimize distribution of the plurality of data packets in the HPC switch 107.

In some embodiments, the plurality of data packets may be reassigned from one destination VL to another destination VL based on the performance value recomputed for each of the one or more ports 119.

Henceforth, the process of optimizing the distribution of data packets in HPC switch 107 is explained with the help of one or more examples for better understanding of the present disclosure. However, the one or more examples should not be considered as limitation of the present disclosure.

Consider an exemplary scenario where 4 controllers, Controller A, Controller B, Controller C and Controller D are connected to the HPC switch 107. Consider that:
Controller A wants to transmit a plurality of data packets to Controller D; and
Controller B wants to transmit a plurality of data packets to Controller C.
The plurality of interconnected QP lanes 115 may receive the plurality of data packets from buffer memory of Controller A and Controller B. Upon receiving the plurality of data packets, the processor 109 may identify the service level information associated with each of the plurality of data packets. As an example, consider the service level information associated with the plurality of data packets received from Controller A specify "Reliable Connection" and the service level information associated with the plurality of data packets received from Controller B specify "Unreliable Connection".

Based on the service level information, the processor 109 may assign a destination VL 10 to Controller A and destination VL 15 to Controller B. Consider that the destination VL 10 is connected to Port 1 and the destination VL 15 is connected to Port 16.

Further, the processor 109 may determine performance value for each of the one or more ports 119 by monitoring transmission rate and receiving rate of the plurality of data packets at the plurality of interconnected QP lanes 115. An exemplary determination of performance value is as shown below for a QP lane 1 using Equation 1.

QP lane 1: Number of data packets received=65
Number of data packets transmitted=45

Performance value(transmitted)=(45/110)*100=41%

Performance value(received)=(65/110)*100=59%

Similarly, the processor 109 may determine performance value for each of the one or more ports 119 based on transmission rate and received rate at the plurality of interconnected QP lanes 115. Based on the performance value, the processor 109 may determine latency of each of the one or more ports 119, based on which, the processor 109 may generate plurality of clusters of the one or more ports 119.

Consider, the processor 109 generated the following clusters:
Cluster A: high latency cluster—centre of the cluster is 85.667
Cluster B: medium latency cluster—centre of the cluster is 62.000
Cluster C: ultra-low latency cluster—centre of the cluster is 36.750

Figure 2B:
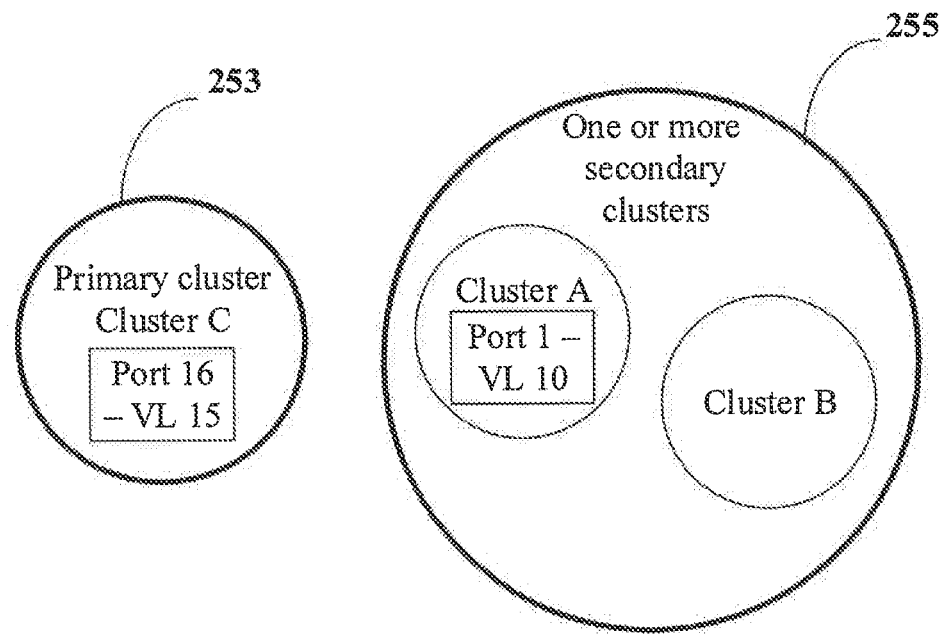
FIG. 2B and FIG. 2C show exemplary clusters of the one or more ports for optimizing distribution of data packets in accordance with some embodiments of the present disclosure.

Among the 3 clusters that are generated by the processor 109, Cluster C may be considered as the primary cluster 253 and the remaining clusters i.e. Cluster A and Cluster B may be considered as the one or more secondary clusters 255. Consider, that Port 16 belongs to the primary cluster 253 and the Port 1 belongs to one of the one of one or more secondary clusters 255 as shown in the FIG. 2B. Therefore, the plurality of data packets assigned to VL 15 connected to port 16 i.e. first group of the plurality of data packets, are transmitted to the Controller C. The plurality of data packets assigned to VL 10 connected to port 1 i.e. second group of the plurality of data packets, are stored in the DMA 121, while acknowledgement key-packet of each of plurality of data packets belonging to the second group are transmitted to the Controller D.

Figure 2C:
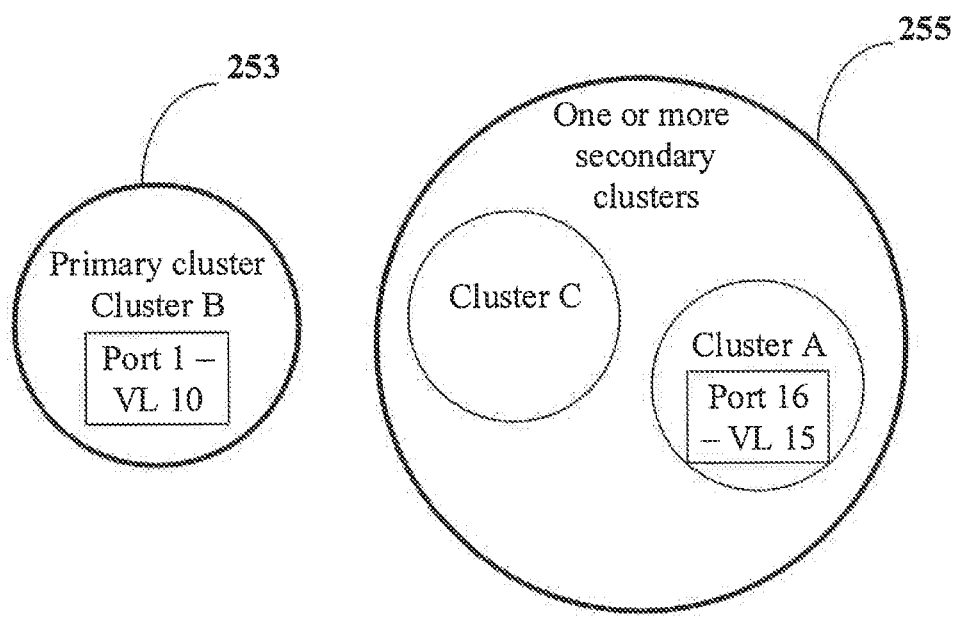

In next iteration, when the performance value is recomputed, port 1 may belong to the primary cluster 253 as shown in the FIG. 2C. Therefore, the plurality of data packets stored in the DMA 121 may be transmitted via the VL 10 connected to port 1, to the Controller D.

In a scenario, consider that port 1 remained in the one or more secondary clusters 255 even after recomputing the performance value. In such scenarios, the plurality of data packets stored in the DMA 121 that are assigned to VL 10 connected to the port 1, may be reassigned to a different VL, which is connected to a port belonging to the primary cluster 253.

Figure 3:
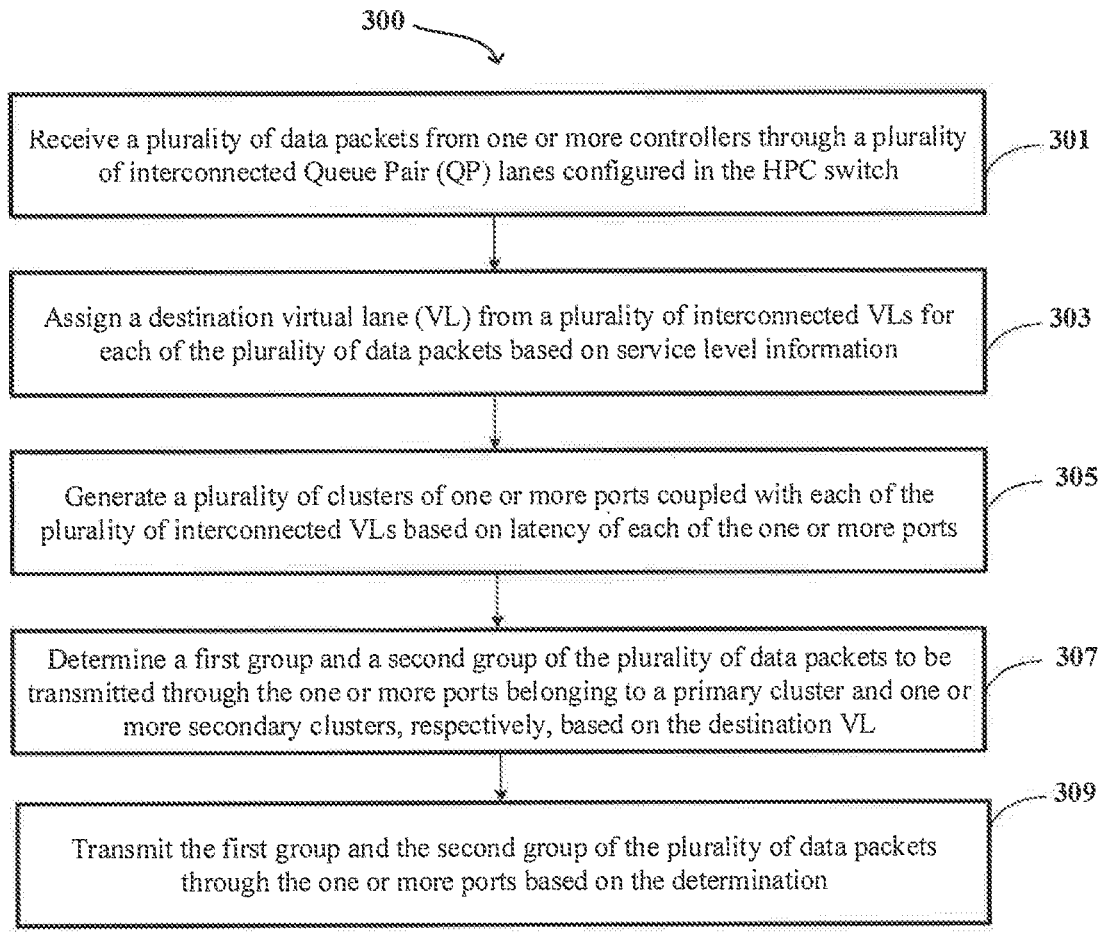
FIG. 3 shows a flowchart illustrating a method of optimizing distribution of data packets in High Performance Computing (HPC) in accordance with some embodiments of the present disclosure.

FIG. 3 shows a flowchart illustrating a method of optimizing distribution of data packets in a High Performance Computing (HPC) switch in accordance with some embodiments of the present disclosure.

As illustrated in FIG. 3, the method 300 includes one or more blocks illustrating a method of optimizing distribution of data packets in a High Performance Computing (HPC) switch 107. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the HPC switch 107, a plurality of data packets from one or more controllers 103 communicatively connected to the HPC switch 107, through a plurality of interconnected Queue Pair (QP) lanes 115 configured in the HPC switch 107. In some embodiments, each of the plurality of interconnected QP lanes 115 may include a send queue and a receive queue.

At block 303, the method 300 may include assigning, by the processor 109, a destination virtual lane (VL) from a plurality of interconnected VLs 117 configured in the HPC switch 107 for each of the plurality of data packets based on service level information associated with each of the plurality of data packets. In some embodiments, each of the plurality of interconnected VLs 117 may be associated with one or more ports 119 configured in the HPC switch 107.

At block 305, the method 300 may include, generating, by the processor 109, a plurality of clusters of the one or more ports 119 based on latency determined dynamically for each of the one or more ports 119. In some embodiments, the processor 109 may compute a performance value based on number of data packets received and transmitted by each of the plurality of interconnected QP lanes 115 for each of the one or more ports 119. Further, the processor 109 may determine latency of the one or more ports 119 dynamically based on the performance value.

At block 307, the method 300 may include, determining, by the processor 109, a first group of the plurality of data packets to be transmitted through the one or more ports 119 belonging to a primary cluster of the plurality of clusters and a second group of the plurality of data packets to be transmitted through the one or more ports 119 belonging to one or more secondary clusters of the plurality of clusters based on the destination VL assigned for each of the plurality of data packets. In some embodiments, the primary cluster among the plurality of clusters comprises the one or more ports 119 having ultra-low latency when compared with a predefined latency threshold. In some embodiments, each of the one or more secondary clusters of the plurality of clusters comprise the one or more ports 119 having high latency when compared with the predefined latency threshold.

At block 309, the method 300 may include, transmitting, by the processor 109, the first group of the plurality of data packets through the one or more ports 119 belonging to the primary cluster, based on the determination, to the one or more other controllers 103. Further, the processor 109 may transmit an acknowledgement key-packet associated with the second group of the plurality of data packets through the one or more ports 119 belonging to the one or more secondary clusters, based on the determination, to the one or more other controllers 103, thereby optimizing the distribution of the plurality of data packets in the HPC switch 107. The processor 109 may further recompute the performance value and reiterate the above mentioned steps, by generating plurality of new clusters of the one or more ports 119 in each iteration.

Figure 4:
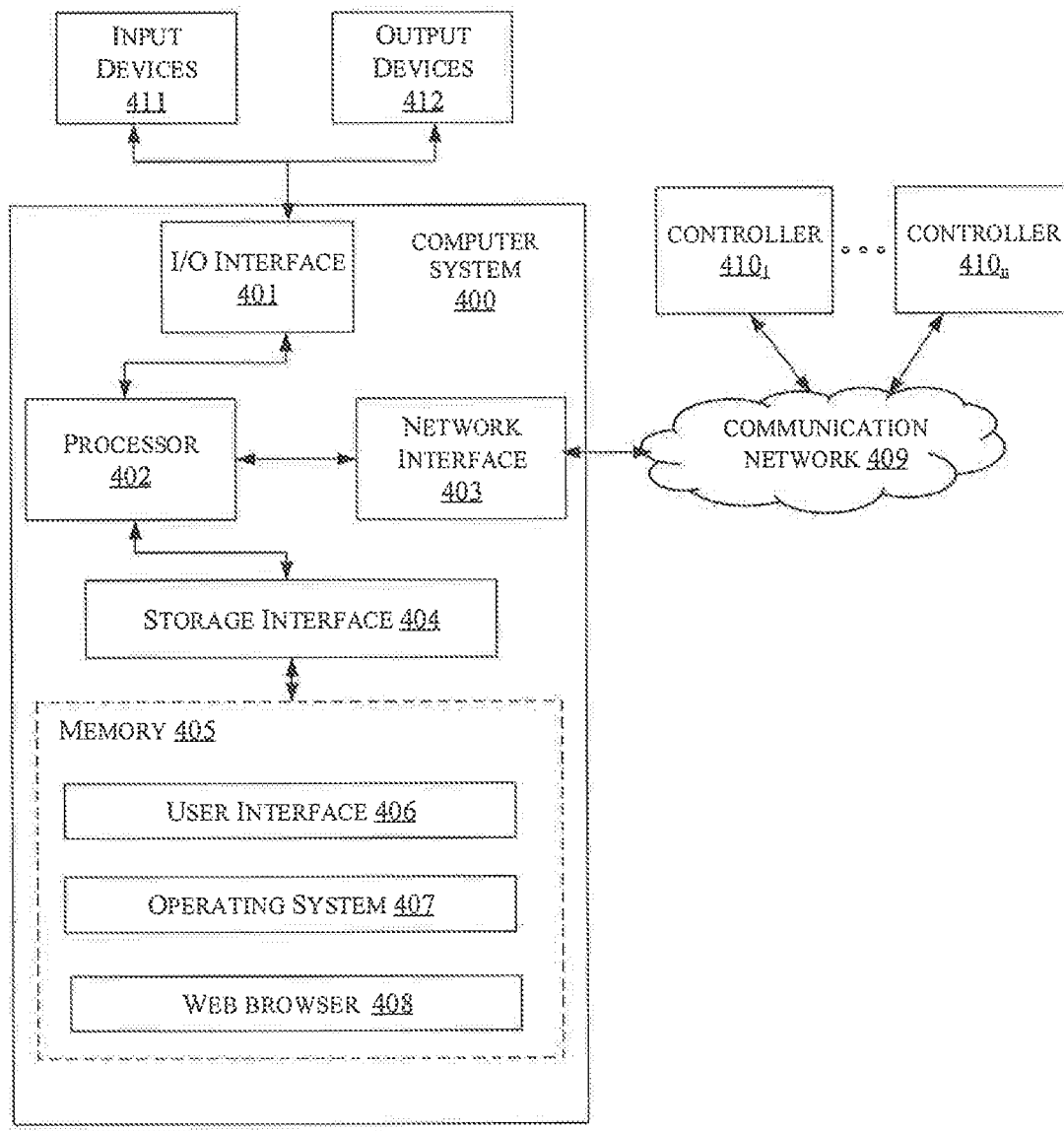
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be High Performance Computing (HPC) switch 107 that is used for optimizing distribution of data packets. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more controllers 410 (controller $410_1$ to controller $410_n$). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

Operating system 407 may facilitate resource management and operation of computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. User interface 406 may facilitate display, execution, interaction, manipulation, or operation of program components through textual or graphical facilities. For example, user interfaces may provide computer interaction interface elements on a display system operatively connected to computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

Computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. Computer system 400 may implement a mail server stored program component. The mail server may be an Internet mail server such as Microsoft Exchange, or the like. The mail server may utilize facilities such as ASP, ACTIVEX®, ANSI® C++/C #, MICROSOFT®, NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein

In some embodiments, the present disclosure provides a method and a system for optimizing distribution of data packets in a High Performance Computing (HPC) switch. Also, the present disclosure provides a new internal architecture comprising plurality of interconnected Queue Pair (QP) lanes and plurality of interconnected Virtual Lanes (VLs) to optimize the distribution of data packets and to relatively reduce latency of one or more ports in the HPC switch.

The present disclosure provides a feature wherein the plurality of clusters are generated based on latency of the one or more ports, that helps in moving the data packets through the one or more ports having ultra-low latency instead of the one or more ports having high latency.

The present disclosure provides a key value streamlining technique that transmits an acknowledgement key-packet when latency of the one or more ports is high, thereby improving performance of communication between multiple controllers connected to the HPC switch.

The present disclosure provides a feature wherein the plurality of data packets assigned to one virtual lane may be reassigned to another virtual lane based on performance of the one or more ports, thereby reducing workload from busy ports.

The present disclosure helps in flexible communication between multiple controllers connected to the HPC switch, as opposed to the existing art that discloses having fixed target controllers.

The present disclosure increases host uptime, reduces Remote Direct Memory Access (RDMA) errors and improves queue sequencing of the plurality of data packets in a Queue Pair (QP) lane.

A description of an embodiment with several components in communication with each other does not imply that all such components are required. On the contrary a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system optimizing distribution of data packets in a High Performance Computing (HPC) switch. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

Referral numerals

| Reference Number | Description |
| --- | --- |
| 100 | Architecture |
| 103 | One or more controllers |
| 107 | High Performance Computing (HPC) switch |
| 109 | Processor |
| 113 | Memory |
| 115 | Plurality of interconnected Queue Pair (QP) lanes |
| 117 | Plurality of interconnected Virtual Lanes (VLs) |
| 119 | One or more ports |
| 121 | Direct Memory Access (DMA) |
| 203 | Data |
| 205 | Modules |

-continued

Referral numerals

| Reference Number | Description |
| --- | --- |
| 209 | Input data |
| 211 | Key Packet data |
| 213 | Performance data |
| 215 | Cluster data |
| 225 | Other data |
| 233 | Receiving module |
| 235 | Virtual Lane (VL) assigning module |
| 239 | Key generation module |
| 241 | Performance computing module |
| 243 | Port clustering module |
| 245 | Packet determining module |
| 247 | Packet transmitting module |
| 251 | Other modules |
| 253 | Exemplary primary cluster |
| 255 | Exemplary one or more secondary clusters |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 410 | One or more controllers of the exemplary computer system |
| 411 | Input devices |
| 412 | Output devices |

What is claimed is:

1. A method of optimizing distribution of data packets in a High Performance Computing (HPC) switch, the method comprising:

receiving, by the HPC switch, a plurality of data packets from one or more controllers communicatively connected to the HPC switch, through a plurality of interconnected Queue Pair (QP) lanes configured in the HPC switch;

assigning, by the HPC switch, a destination Virtual Lane (VL) from a plurality of interconnected VLs configured in the HPC switch for each of the plurality of data packets based on service level information associated with each of the plurality of data packets;

generating, by the HPC switch, a plurality of clusters of one or more ports, configured in the HPC switch, coupled with each of the plurality of interconnected VLs based on latency determined dynamically for each of the one or more ports;

determining, by the HPC switch, a first group of the plurality of data packets to be transmitted through the one or more ports belonging to a primary cluster of the plurality of clusters and a second group of the plurality of data packets to be transmitted through the one or more ports belonging to one or more secondary clusters of the plurality of clusters based on the destination VL assigned for each of the plurality of data packets;

transmitting, by the HPC switch, the first group of the plurality of data packets through the one or more ports belonging to the primary cluster and transmitting an acknowledgement key-packet associated with the second group of the plurality of data packets through the one or more ports belonging to the one or more secondary clusters, based on the determination, to the one or more other controllers communicatively connected to the HPC switch for optimizing the distribution of the plurality of data packets in the HPC switch (107); and storing, by the HPC switch, the second group of the plurality of data packets for which the acknowledgement key-packet is transmitted, in a Direct Memory Access (DMA) configured in the HPC switch.

2. The method as claimed in claim 1, wherein the latency of each of the one or more ports is determined using a performance value computed for each of the one or more ports.

3. The method as claimed in claim 2, wherein the performance value is computed based on number of data packets received and transmitted by each of the plurality of interconnected QP lanes for each of the one or more ports.

4. The method as claimed in claim 3, wherein the performance value for each of the one or more ports is recomputed at predefined time intervals, to generate a plurality of new clusters of the one or more ports for transmitting at least one of the second group of the plurality of data packets stored in a Direct Memory Access (DMA) and a plurality of new data packets received by the HPC switch, to one or more other controllers.

5. The method as claimed in claim 1, further comprising reassigning the second group of the plurality of data packets to another destination VL based on a performance value recomputed for each of the one or more ports, at predefined time intervals.

6. The method as claimed in claim 1, wherein the primary cluster among the plurality of clusters comprises the one or more ports having ultra-low latency when compared with a predefined latency threshold, and each of the one or more secondary clusters of the plurality of clusters comprise the one or more ports having high latency when compared with the predefined latency threshold.

7. The method as claimed in claim 1, wherein the acknowledgement key-packet is generated, by the HPC switch, for each of the plurality of data packets, wherein the acknowledgement key-packet comprises at least a key value indicating destination of each of the plurality of data packets.

8. The method as claimed in claim 7, wherein the acknowledgement key-packet comprises a size less than size of the corresponding plurality of data packets.

9. A High Performance Computing (HPC) switch for optimizing distribution of data packets, the HPC switch comprising:

a processor; and a memory communicatively coupled to the processor, wherein the memory stores processor-executable instructions, which, on execution, causes the processor to:

receive a plurality of data packets from one or more controllers communicatively connected to the HPC switch, through a plurality of interconnected Queue Pair (QP) lanes configured in the HPC switch;

assign a destination Virtual Lane (VL) from a plurality of interconnected VLs configured in the HPC switch for each of the plurality of data packets based on service level information associated with each of the plurality of data packets;

generate a plurality of clusters of one or more ports, configured in the HPC switch, coupled with each of the plurality of interconnected VLs based on latency determined dynamically for each of the one or more ports;

determine a first group of the plurality of data packets to be transmitted through the one or more ports belonging to a primary cluster of the plurality of clusters and a second group of the plurality of data packets to be transmitted through one or more ports belonging to one or more secondary clusters of the plurality of clusters based on the destination VL assigned for each of the plurality of data packets;

transmit the first group of the plurality of data packets through the one or more ports belonging to the primary cluster and transmitting an acknowledgement key-packet associated with the second group of the plurality of data packets through the one or more ports belonging to the one or more secondary clusters, based on the determination, to the one or more other controllers communicatively connected to the HPC switch for optimizing the distribution of the plurality of data packets in the HPC switch; and store the second group of the plurality of data packets for which the acknowledgement key-packet is transmitted, in a Direct Memory Access (DMA) configured in the HPC switch.

10. The HPC switch as claimed in claim 9, wherein the processor determines the latency of each of the one or more ports using a performance value computed for each of the one or more ports.

11. The HPC switch as claimed in claim 10, wherein the processor computes the performance value based on number of data packets received and transmitted by each of the plurality of interconnected QP lanes for each of the one or more ports.

12. The HPC switch as claimed in claim 11, wherein the processor is further configured to recompute the performance value for each of the one or more ports at predefined time intervals, to generate a plurality of new clusters of the one or more ports for transmitting at least one of, the second group of the plurality of data packets stored in a Direct Memory Access (DMA) and a plurality of new data packets received by the HPC switch, to one or more other controllers.

13. The HPC switch as claimed in claim 9, wherein the processor is further configured to reassign the second group of the plurality of data packets to another destination VL based on a performance value recomputed for each of the one or more ports, at predefined time intervals.

14. The HPC switch as claimed in claim 9, wherein the primary cluster among the plurality of clusters comprises the one or more ports having ultra-low latency when compared with a predefined latency threshold, and each of the one or more secondary clusters of the plurality of clusters comprise the one or more ports having high latency when compared with the predefined latency threshold.

15. The HPC switch as claimed in claim 9, wherein the processor generates the acknowledgement key-packet for each of the plurality of data packets, wherein the acknowledgement key-packet comprises at least a key value indicating destination of each of the plurality of data packets.

16. The HPC switch as claimed in claim 15, wherein size of the acknowledgement key-packet is less than size of the corresponding plurality of data packets.

17. A non-transitory computer readable medium including instructions stored thereon that when processed by at least one processor causes a High Performance Computing (HPC) switch to perform operations comprising:

receive a plurality of data packets from one or more controllers communicatively connected to the HPC switch, through a plurality of interconnected Queue Pair (QP) lanes configured in the HPC switch;

assign a destination Virtual Lane (VL) from a plurality of interconnected VLs configured in the HPC switch for each of the plurality of data packets based on service level information associated with each of the plurality of data packets;

generate a plurality of clusters of one or more ports, configured in the HPC switch, coupled with each of the plurality of interconnected VLs based on latency determined dynamically for each of the one or more ports;

determine a first group of the plurality of data packets to be transmitted through the one or more ports belonging to a primary cluster of the plurality of clusters and a second group of the plurality of data packets to be transmitted through the one or more ports belonging to one or more secondary clusters of the plurality of clusters based on the destination VL assigned for each of the plurality of data packets;

transmit the first group of the plurality of data packets through the one or more ports belonging to the primary cluster and transmitting an acknowledgement key-packet associated with the second group of the plurality of data packets through the one or more ports belonging to the one or more secondary clusters, based on the determination, to the one or more other controllers communicatively connected to the HPC switch for optimizing the distribution of the plurality of data packets in the HPC switch; and store the second group of the plurality of data packets for which the acknowledgement key-packet is transmitted, in a Direct Memory Access (DMA) configured in the HPC switch.

\* \* \* \* \*